Patented Oct. 30, 1934

1,978,848

UNITED STATES PATENT OFFICE 1,978,848

METHOD OF MAKING ARTICLES FROM LATEX

Harlan L. Trumbull, Hudson, Ohio, assignor to The B. F. Goodrich Company, New York, N. Y., a corporation of New York No Drawing. Application July 12, 1933, Serial No. 680,152

20 Claims. (Cl. 18—58)

This invention relates to the manufacture of rubber articles directly from latex or analogous aqueous dispersions of rubber.

Rubber articles are now made directly from liquid latex by any one of several well known methods wherein a shaped form is dipped into the latex, a coating of rubber is deposited upon the form, and the form is withdrawn from the latex with the associated rubber coating which subsequently is dried and vulcanized. It is frequently desired to manufacture by such a method articles which have surface portions meeting at an angle, or which are contiguous one to the other, as for example the fingers and finger crotches of a glove. It is also often necessary to coat with rubber articles such as wire screens which have many surfaces meeting at angles. When a form having such surface portions is immersed in a body of latex, is allowed to acquire a coating of rubber and then is withdrawn, the liquid latex frequently forms a thin web or film between the contiguous portions of the deposited rubber, and/or between the deposited rubber and the surface of the liquid latex as the coated form emerges from the latex. Such films, if they should remain intact, obviously would produce defects in the finished article, and consequently, they must be broken. However, whether they are broken mechanically by an operator, or are dried sufficiently to cause them to contract and break of themselves, the snap of the breaking film produces surface irregularities upon the adjacent wet or only partially dried rubber deposit, which together with the accumulation of rubber at the points of film formation produces surface blemishes and irregularities sufficiently serious to reduce materially the sales value of the product.

The film formation may be prevented to some extent by rapidly removing the forms from the latex, but this expedient cannot be resorted to in many cases, particularly when heavy rubber deposits are being produced requiring a slow gradual withdrawal of the coated form which slow removal is especially favorable to the production of undesirable latex films between contiguous portions of the deposited rubber.

It is accordingly the object of this invention to provide a method of making rubber articles of the type described which will be free from surface defects. It is a further object of the invention to provide a method of breaking undesirable latex films which may form between portions of the rubber deposit and/or between the deposit and the surface of the latex as the coated form is withdrawn from the latex, without producing any surface defects in the finished article. Other objects will be apparent from the following description of the invention.

Broadly, the present invention comprises immersing in a bath of liquid latex a shaped form having surfaces contiguous or meeting at an angle, between which liquid films may form, depositing upon the form a coating of rubber from the latex, withdrawing the form from the body of latex with the attendant formation of undesirable latex films between the surface portions, and then suddenly changing the surface tension conditions in localized areas of the films sufficiently to cause them to break, without however producing the undesirable surface blemishes usually accompanying mechanical breaking of the films.

In a preferred embodiment, the invention comprises spraying or otherwise applying a readily volatile organic liquid such as ether, alcohol, or chloroform to the latex films and adjacent areas as, or shortly after, they emerge from the liquid latex. In practice, it has been found most satisfactory to direct a fine mist of the volatile liquid with a compressed air spray gun upon the latex coated form as it emerges from the deposition bath. It has been found also that the effect is improved if there is incorporated in the volatile liquid a relatively small amount, usually 0.5 to 5.0% of a high-boiling alcohol such as butanol, carvacrol, terpineol, or other alcohol, preferably of the terpene series, which is soluble in the volatile liquid used. Such treatment causes any films which may form between contiguous portions of the article to break immediately, or before the film has become strong or heavy enough to cause any damage or to produce surface irregularities upon breaking.

The manner in which the treating liquid functions to produce the desired results is not well understood at the present time, but the effect is believed to be due at least in part to sudden changes in surface tension equilibria produced in localized areas of the liquid films by small droplets of the treating liquid applied at such areas. However, applicant does not desire or intend to limit his invention to this or any other particular theory which may be advanced by way of explanation of his discovery.

As a specific example of the manner of practicing the present invention, the manufacture of a rubber glove will be described. A glove form of usual construction is immersed, fingers downward, in a body of a suitably compounded aqueous dispersion of rubber, such as compounded latex, and a desired thickness of rubber is deposited on the form by any well known process, such as by electrophoresis, by ionic coagulation, by heat coagulation, or by merely dipping. The form is slowly removed from the latex, and as the fingers emerge from the body of latex, they are sprayed quickly with a 2% solution of terpineol in diethyl ether which serves to break any liquid films which may form between them and/or between the deposited rubber and the surface of the liquid latex. Any excess liquid is allowed to drain off, after which the glove may be dried, vulcanized, or otherwise finished in any of the several ways practiced in the manufacture of such articles.

By the method of this invention, the surface defects and blemishes, especially between the fingers, thumb, and forefingers of gloves and at similar portions of other articles are completely eliminated and the finished article is uniformly smooth over its entire surface.

It is understood that the invention may be applied to articles other than those specifically mentioned, and is in fact applicable to the manufacture of any article having surfaces meeting at an angle or otherwise so disposed or shaped that a web or film of rubber tends to form between such surfaces and/or between the deposited rubber and the surface of the latex upon withdrawing the article from latex. Accordingly, the term "form" is employed in the appended claims in a broad sense to include all shaped articles upon which a rubber coating is deposited, whether the coating is to be removed from the form or is to be allowed to remain thereon as a permanent coating.

Likewise, the term "latex" has been used in the specification and claims in a generic sense to include all natural or artificial aqueous dispersions of rubber or like gums, whether in the unvulcanized, vulcanized or reclaimed condition. The latex may contain any desirable thickening, thinning, stabilizing, or like conditioning agents, as well as vulcanizing agents, accelerators, age-resistors, fillers, pigments and like compounding ingredients.

Numerous changes and variations may be made in the procedure hereinabove described without departing from the spirit of the invention as defined in the appended claims.

I claim:

1. In the deposition of rubber from liquid latex upon a form having surfaces so disposed relatively one to the other as to favor the formation of an undesirable film of latex between rubber deposited on such surfaces and/or between the deposited rubber and the liquid latex, the method which comprises the step of altering the surface tension of the latex at and between such surfaces, by applying thereto a volatile organic liquid containing a less volatile higher alcohol.

2. The method as specified in claim 1 in which the volatile organic liquid is ether.

3. The method as specified in claim 1 in which the less volatile higher alcohol is a member of the terpene series.

4. The method as specified in claim 1 in which the volatile organic liquid is ether and the less volatile higher alcohol is terpineol.

5. In the deposition of rubber from liquid latex upon a form having surfaces so disposed relatively one to the other as to favor the formation of an undesirable film of latex between rubber deposited on such surfaces and/or between the deposited rubber and the liquid latex, the method which comprises the step of altering the surface tension of the latex at and between such surfaces by applying thereto droplets of ether containing no ionizable solute.

6. The method of making rubber articles which comprises immersing in a body of latex a form having surface portions disposed contiguous to each other in such manner as to favor the formation of an undesirable web of latex between such surface portions when the form is withdrawn from the body of latex, withdrawing said form and breaking down web formation between said surface portions as the form is withdrawn by altering the surface tension of the latex at and between the said surface portions.

7. The method as specified in claim 6 in which the surface tension of the latex is altered by applying thereto a volatile organic liquid.

8. The method as specified in claim 6 in which the surface tension of the latex is altered by applying thereto a volatile organic liquid containing a less volatile higher alcohol.

9. The method as specified in claim 6 in which the web formation is broken down by treating the latex constituting the web with ether.

10. The method as specified in claim 6 in which the web formation is broken down by spraying the latex constituting the web with a solution of terpineol in a volatile organic solvent.

11. The method of breaking an undesirable latex film on a freshly deposited rubber article which comprises treating the film with ether, containing no ionizable solute.

12. The method of breaking an undesirable latex film on a freshly deposited rubber article which comprises treating the film with a readily volatile organic liquid containing a less volatile higher alcohol.

13. The method of breaking an undesirable latex film on a freshly deposited rubber article which comprises treating the film with a mixture containing an alcohol of the terpene series dissolved in a volatile organic solvent.

14. The method of breaking an undesirable film on a freshly deposited rubber article which comprises treating the film with a solution of terpineol in a volatile organic solvent.

15. The method of breaking an undesirable latex film on a freshly deposited rubber article which comprises treating the film with a solution of terpineol in ether.

16. The method of breaking an undesirable latex film on a freshly deposited latex rubber article which comprises spraying the article with a solution of terpineol in ether as it emerges from the body of latex in which deposition occurred.

17. The method of breaking an undesirable latex film on a freshly deposited rubber article which comprises treating the film with a solution containing a high-boiling alcohol.

18. The method of breaking an undesirable latex film on a freshly deposited rubber article which comprises treating the film with a solution containing an alcohol of the terpene series.

19. The method of breaking an undesirable latex film on a freshly deposited rubber article which comprises treating the film with a solution containing terpineol.

20. The method of breaking an undesirable latex film on a freshly deposited rubber article which comprises treating the film with a solution containing an alcohol having the properties of the group consisting of butanol, carvacrol, and terpineol.

HARLAN L. TRUMBULL.